United States Patent
Dai et al.

(10) Patent No.: US 9,467,054 B2
(45) Date of Patent: Oct. 11, 2016

(54) CURRENT SENSING APPARATUS FOR RESONANT TANK IN AN LLC RESONANT CONVERTER

(71) Applicant: FutureWei Technologies, Inc., Plano, TX (US)

(72) Inventors: Heping Dai, Plano, TX (US); Xujun Liu, Shenzhen (CN); Liming Ye, Frisco, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 114 days.

(21) Appl. No.: 14/074,246

(22) Filed: Nov. 7, 2013

(65) Prior Publication Data
US 2015/0124489 A1 May 7, 2015

(51) Int. Cl.
*H02M 3/335* (2006.01)
*H02M 1/00* (2006.01)

(52) U.S. Cl.
CPC .......... *H02M 3/335* (2013.01); *H02M 3/3353* (2013.01); *H02M 3/33538* (2013.01); *H02M 3/33576* (2013.01); *H02M 2001/0009* (2013.01); *H02M 2001/0058* (2013.01); *Y02B 70/1433* (2013.01); *Y02B 70/1491* (2013.01)

(58) Field of Classification Search
CPC .......... H02M 3/335; H02M 3/33507; H02M 3/3353; H02M 2001/0009; H02M 3/338; H02M 2001/0058; H02M 3/3385; Y02B 70/1433; Y02B 70/1475
See application file for complete search history.

(56) References Cited

U.S. PATENT DOCUMENTS

| | | | | |
|---|---|---|---|---|
| 7,545,138 | B2* | 6/2009 | Wilkerson et al. | 324/127 |
| 2009/0097280 | A1* | 4/2009 | Wu | H02M 3/33592 363/17 |
| 2013/0208513 | A1* | 8/2013 | Germe | H02M 1/40 363/21.13 |

OTHER PUBLICATIONS

Jinhaeng Jang; Kumar, P.S.; Dongyun Kim; Byungcho Choi, "Average current-mode control for LLC series resonant dc-to-dc converters," Power Electronics and Motion Control Conference (IPEMC), 2012 7th International , vol. 2, No., pp. 923-930, Jun. 2-5, 2012.*

* cited by examiner

*Primary Examiner* — Fred E Finch, III
*Assistant Examiner* — Peter Novak
(74) *Attorney, Agent, or Firm* — Slater Matsil, LLP

(57) ABSTRACT

An apparatus comprises a magnetic device coupled to an inductor-inductor-capacitor (LLC) resonant converter, an ac current sensing circuit coupled to the magnetic device, an average current sensing circuit coupled to the ac current sensing circuit and a reference voltage source coupled to the average current sensing circuit, wherein the reference voltage source is configured such that a magnitude of an average signal from the average current sensing circuit is greater than a voltage level of the reference voltage source.

20 Claims, 10 Drawing Sheets

CURRENT SENSING APPARATUS FOR RESONANT TANK IN AN LLC RESONANT CONVERTER

TECHNICAL FIELD

The present invention relates to a resonant converter, and, in particular embodiments, to a current sensing apparatus for resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which improve the efficiency of an inductor-inductor-capacitor (LLC) resonant power converter.

In accordance with an embodiment, a converter comprises a switch network coupled to a power source, wherein the switch network comprises a plurality of power switches, a resonant tank coupled to the plurality of power switches, wherein the resonant tank comprises a series resonant inductor and a series resonant capacitor, a transformer coupled to the resonant tank, an output stage coupled to the transformer and a current sensing apparatus coupled to the series resonant inductor through a magnetic coupling, wherein the current sensing apparatus is configured to generate a detected signal proportional to a current flowing through the series resonant inductor and output an average signal of the detected signal.

In accordance with another embodiment, an apparatus comprises a magnetic device coupled to an inductor-inductor-capacitor (LLC) resonant converter, an ac current sensing circuit coupled to the magnetic device, an average current sensing circuit coupled to the ac current sensing circuit and a reference voltage source coupled to the average current sensing circuit, wherein the reference voltage source is configured such that a magnitude of an average signal from the average current sensing circuit is greater than a voltage level of the reference voltage source.

In accordance with yet another embodiment, a method comprises providing a resonant converter, wherein the resonant converter comprises a switch network coupled to a power source, wherein the switch network comprises a plurality of power switches, a resonant tank coupled to the plurality of power switches, wherein the resonant tank comprises a series resonant inductor and a series resonant capacitor, an isolation device coupled to the resonant tank, an output stage coupled to the isolation device through a rectifier and a current sensing apparatus.

The method further comprises detecting an ac signal proportional to a current flowing through the series resonant inductor, providing a reference voltage source coupled to the current sensing apparatus and converting the ac signal into an average current signal, wherein a magnitude of the average current signal is greater than a voltage level of the reference voltage source.

An advantage of a preferred embodiment of the present invention is improving an LLC resonant converter's performance through sensing the current flowing through the resonant tank of the LLC converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a current sensing apparatus for an inductor-inductor-capacitor (LLC) resonant converter. The invention may also be applied, however, to a variety of resonant converters. Hereinafter, various embodiments will be explained in detail with reference to the accompanying drawings.

Figure 1:
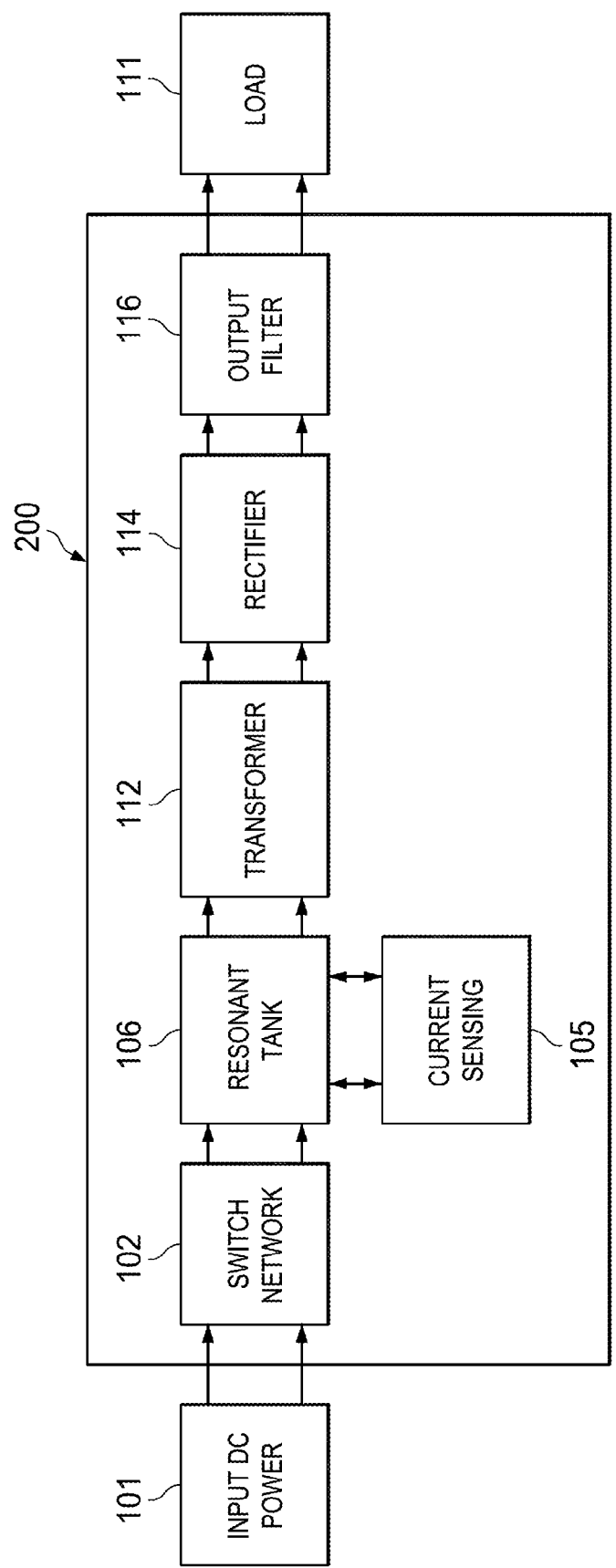
FIG. 1 illustrates a block diagram of an LLC resonant converter in accordance with various embodiments of the present disclosure.

FIG. 1 illustrates a block diagram of an LLC resonant converter in accordance with various embodiments of the present disclosure. The LLC resonant converter 200 is coupled between an input dc power source 101 and a load 111. The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, a resonant tank 106, a current sensing apparatus 105, a transformer 112, a rectifier 114 and an output filter 116. As shown in FIG. 1, the switch network 102, the resonant tank 106, the transformer 112, the rectifier 114 and the output filter 116 are coupled to each other and connected in cascade between the input dc power source 101 and the load 111. The current sensing apparatus 105 is coupled to the resonant tank 106.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

Figure 2:
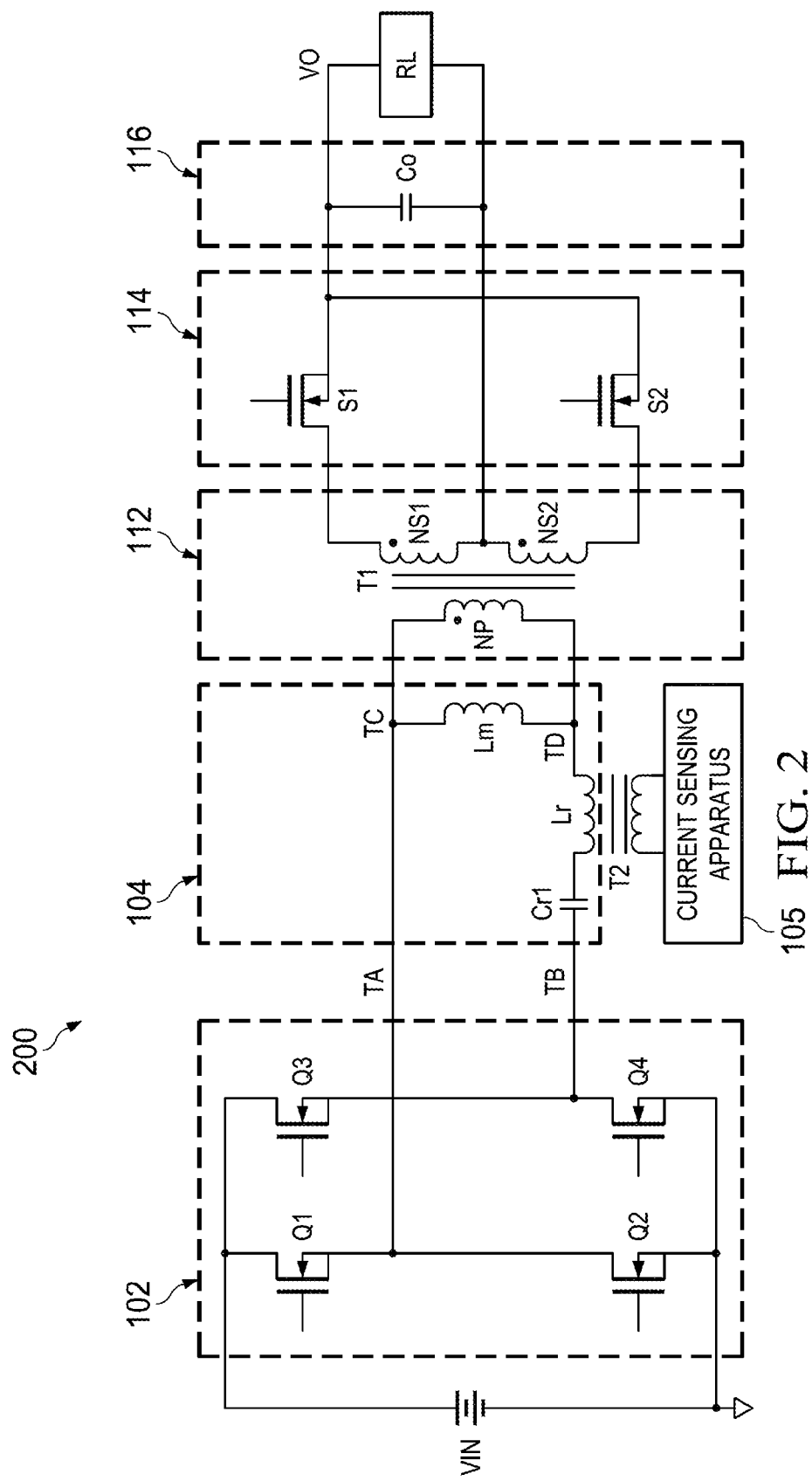
FIG. 2 illustrates a schematic diagram of the LLC resonant converter shown in FIG. 1 in accordance with various embodiments of the present disclosure.

The resonant tank 106 may comprise a first series resonant inductor, a first parallel resonant inductor and a first series resonant capacitor (shown in FIG. 2). The resonant tank 106 may be implemented in a variety of ways. For example, the first series resonant inductor and the first parallel resonant inductor may be implemented as external inductors. Alternatively, the first series resonant inductor may be implemented as a leakage inductance of the transformer 112. The first parallel resonant inductor may be implemented as a magnetizing inductance of the transformer 112.

In sum, the resonant tank 106 includes three key resonant elements, namely the first series resonant inductor, the first series resonant capacitor and the parallel resonant inductor. Such a configuration is commonly referred to as an LLC resonant converter. According to the operating principle of LLC resonant converters, at a switching frequency approximately equal to the resonant frequency of the resonant tank 106, the LLC resonant converter 200 may help to achieve zero voltage switching for the primary side switching elements and zero current switching for the secondary side switching elements.

The current sensing apparatus 105 is coupled to the resonant tank 106 as shown in FIG. 1. However, as one having ordinary skill in the art will recognize, the coupling between the current sensing apparatus 105 and the resonant tank 106 shown in FIG. 1 is merely an exemplary diagram and is not meant to limit the current embodiments. Other suitable couplings, such as a current sensing apparatus coupled to the transformer 112, may alternatively be used. Any suitable couplings may be used, and all such couplings are fully intended to be included within the scope of the embodiments discussed herein.

In some embodiments, the current sensing apparatus 105 is employed to detect a current flowing through the LLC resonant converter 200. The current may be detected from the series resonant inductor of the resonant tank 106, a winding of the transformer 112, any combinations thereof and/or the like.

The current sensing apparatus 105 may comprise an ac current sensing circuit, an average current sensing circuit, a reference voltage source and a temperature compensation circuit. The detailed schematic diagram of the current sensing apparatus 105 will be discussed below with respect to FIG. 3 and FIG. 7.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

FIG. 2 illustrates a schematic diagram of the LLC resonant converter shown in FIG. 1 in accordance with various embodiments of the present disclosure. The switch network 102 includes four switching elements, namely Q1, Q2, Q3 and Q4. As shown in FIG. 2, a first pair of switching elements Q1 and Q2 are connected in series. A second pair of switching elements Q3 and Q4 are connected in series. The common node of the switching elements Q1 and Q2 is coupled to a first input terminal TA of the resonant tank 106. Likewise, the common node of the switching elements Q3 and Q4 is coupled to a second input terminal TB of the resonant tank 106.

The switching elements Q1, Q2, Q3 and Q4 form a primary side switching network of a full bridge resonant converter. According to some embodiments, switching elements Q1, Q2, Q3 and Q4 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter shown in FIG. 2), the LLC resonant converter 200 shown in FIG. 2 may have many variations, alternatives, and modifications.

For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q1, Q2, Q3, and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

FIG. 2 further illustrates the current sensing apparatus 105 is coupled to the resonant tank 106 through a signal transformer T2. The resonant tank 104 is formed by a first series resonant inductor Lr, a first series resonant capacitor Cr1 and a first parallel inductance Lm. As shown in FIG. 2, the first resonant inductor Lr and the first resonant capacitor Cr1 are connected in series and further coupled to the primary side of the transformer 112.

As shown in FIG. 2, the first series resonant inductor Lr is a primary side of the signal transformer T2. The secondary side of the transformer T2 is coupled to the current sensing apparatus 105. In operation, the current sensing apparatus 105 detects an ac current from the secondary side of the signal transformer T2. The ac current is proportional to the current flowing through the first series resonant inductor Lr. The detailed implementation of the current sensing apparatus 105 will be described below with respect to FIG. 3.

One advantageous feature of the LLC resonant converter 200 shown in FIG. 2 is that the current sensing apparatus 105 is capable of detecting the current flowing through the first series resonant inductor Lr. Such a detected current signal helps to improve various performance characteristics of the LLC resonant converter 200 such as current limiting, short-circuit protection, close-loop control and/or the like. Furthermore, a better estimate of the current flowing through the resonant tank helps the LLC resonant converter 200 achieve zero voltage switching for the primary side switches and zero current switching for the secondary side switches. The soft switching operation of the primary and secondary switches helps to achieve high efficiency.

It should be noted while FIG. 2 shows the first series resonant inductor Lr is an independent component, the first series resonant inductor Lr may be replaced by the leakage inductance of the transformer 112. In other words, the leakage inductance (not shown) may function as the first series resonant inductor Lr.

The transformer 112 may be of a primary winding and a center tapped secondary winding. The primary winding is coupled to terminals TC and TD of the resonant tank 106 as shown in FIG. 2. The secondary winding is coupled to the load through the rectifier 114, which is formed by switches S1 and S2.

It should be noted the transformer structure shown in FIG. 2 is merely an example. One person skilled in the art will recognize many alternatives, variations and modification. For example, the secondary side of the transformer 112 may be a single winding. As a result, the secondary side may employ a synchronous rectifier formed by four switching elements (a.k.a. full wave rectifier). The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

Figure 3:
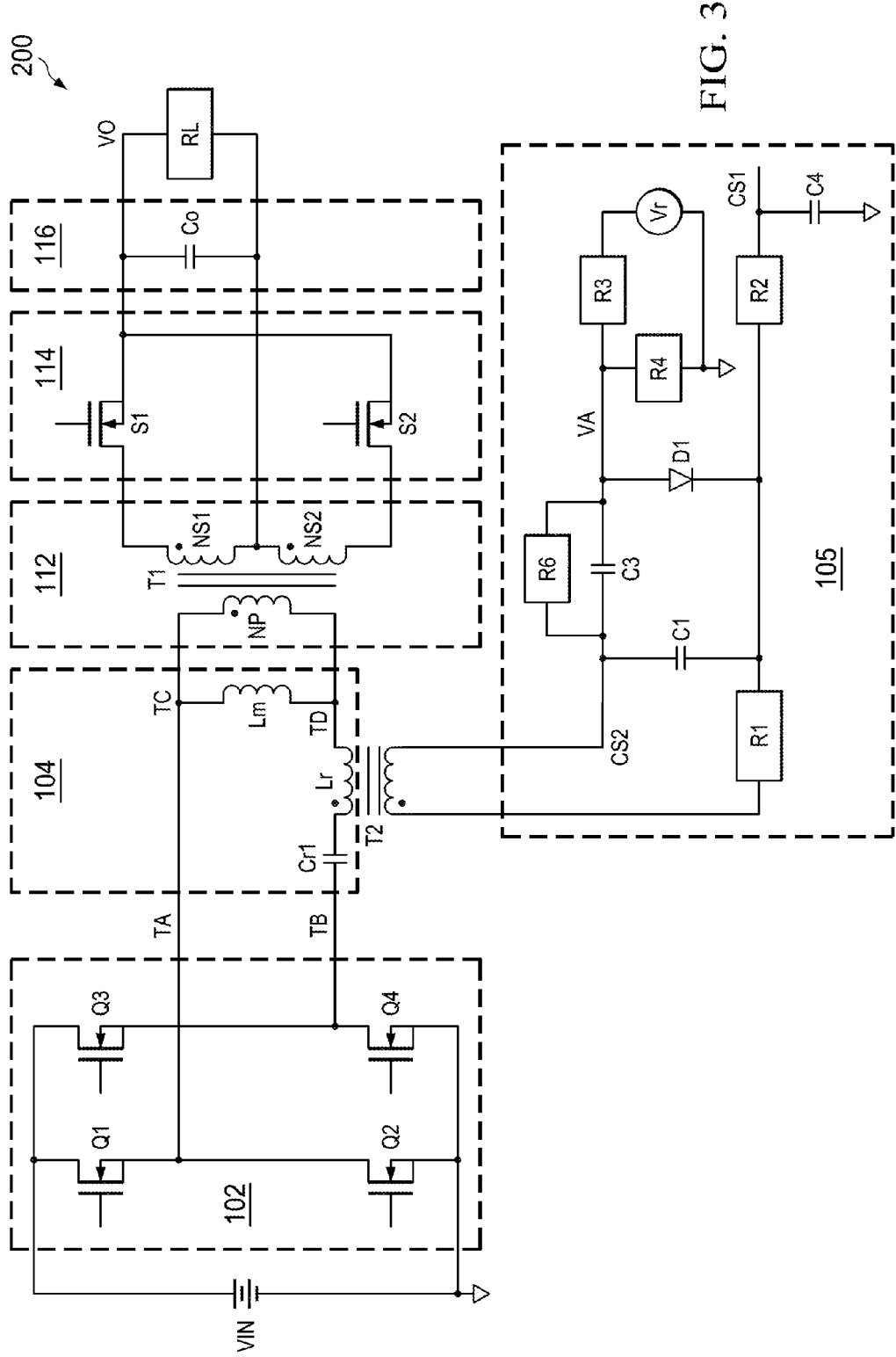
FIG. 3 illustrates a first illustrative implementation of the current sensing apparatus shown in FIG. 2 in accordance with various embodiments of the present disclosure.

FIG. 3 illustrates a first illustrative implementation of the current sensing apparatus shown in FIG. 2 in accordance with various embodiments of the present disclosure. The structure and operation principle of the switch network 102, the resonant tank 104, the transformer 112, the rectifier 114 and the output filter 116 are similar to those shown in FIG. 2, and hence are not discussed again to avoid repetition.

The current sensing apparatus 105 can be divided into three portions, namely an ac current sensing circuit, an average current sensing circuit and a reference voltage circuit. As shown in FIG. 3, the ac current sensing circuit may comprise R1, C1 and C3. The output of the ac current sensing circuit is defined as CS2 as shown in FIG. 3. In some embodiments, CS2 is an ac signal, which is proportional to the current flowing through the first series resonant inductor Lr.

The average current sensing circuit may comprise a diode D1 and a resistor-capacitor (RC) filter formed by R2 and C4. The output of the average current sensing circuit is defined as CS1 as shown in FIG. 3. In some embodiments, the diode D1 may function as a rectifier. The rectifier is employed to convert the ac voltage generated by the ac current sensing circuit into a dc voltage. In addition, the RC filter is used to attenuate noise so that the current sensing apparatus 105 may generate a noise free dc signal.

The reference voltage circuit includes a reference voltage source Vr and a divider circuit formed by R3 and R4 as shown in FIG. 3. The reference voltage source Vr is employed to provide an offset so that the voltage level of CS1 is in a range suitable for integrated circuits (e.g., a comparator) processing the average current signal. The divider circuit is used to adjust the offset so that an appropriate dc voltage signal is fed into the integrated circuits through adjusting the ratio of R3 to R4. The voltage at the output of the divider is given by the following equation:

$$VA = Vr \frac{R4}{R3 + R4} \quad (1)$$

The voltage VA helps to increase the output voltage of the average current sensing circuit. In other words, the voltage level of CS1 is greater than VA. Depending on different applications and design needs, the reference voltage source Vr can be selected accordingly. As a result, the average current sensing circuit may generate an appropriate dc voltage signal suitable for a downstream circuit coupled to the current sensing apparatus 105. For example, a comparator (not shown) may be employed to compare the average current signal with a predetermined reference. However, the comparator may not work correctly if the magnitude of the average current signal is too low. The voltage VA may help to boost the average current signal to an appropriate level so that the comparator can accurately compare the average current signal with the predetermined reference.

In some embodiments, the capacitance of C1 is equal to 47 pF. The resistance of R1 is equal to 10 Kohm. The capacitance of C3 is equal to 390 pF. The capacitance of C4 is equal to 1 nF. The resistance of R2 is equal to 10 Kohm. The resistance of R3 is equal to 2 Kohm. The resistance of R4 is equal to 600 ohm. The reference voltage source Vr is about 3.3 V. R6 is optional. R6 may be connected in parallel with C3. The resistance of R6 is equal to 3 Kohm.

It should be noted that the values given above are selected purely for demonstration purposes and are not intended to limit the various embodiments of the present invention to any particular values. A person skilled in the art will recognize that, depending on different application and design needs, the resistance and capacitance recited above may be changed to different values.

Figure 4:
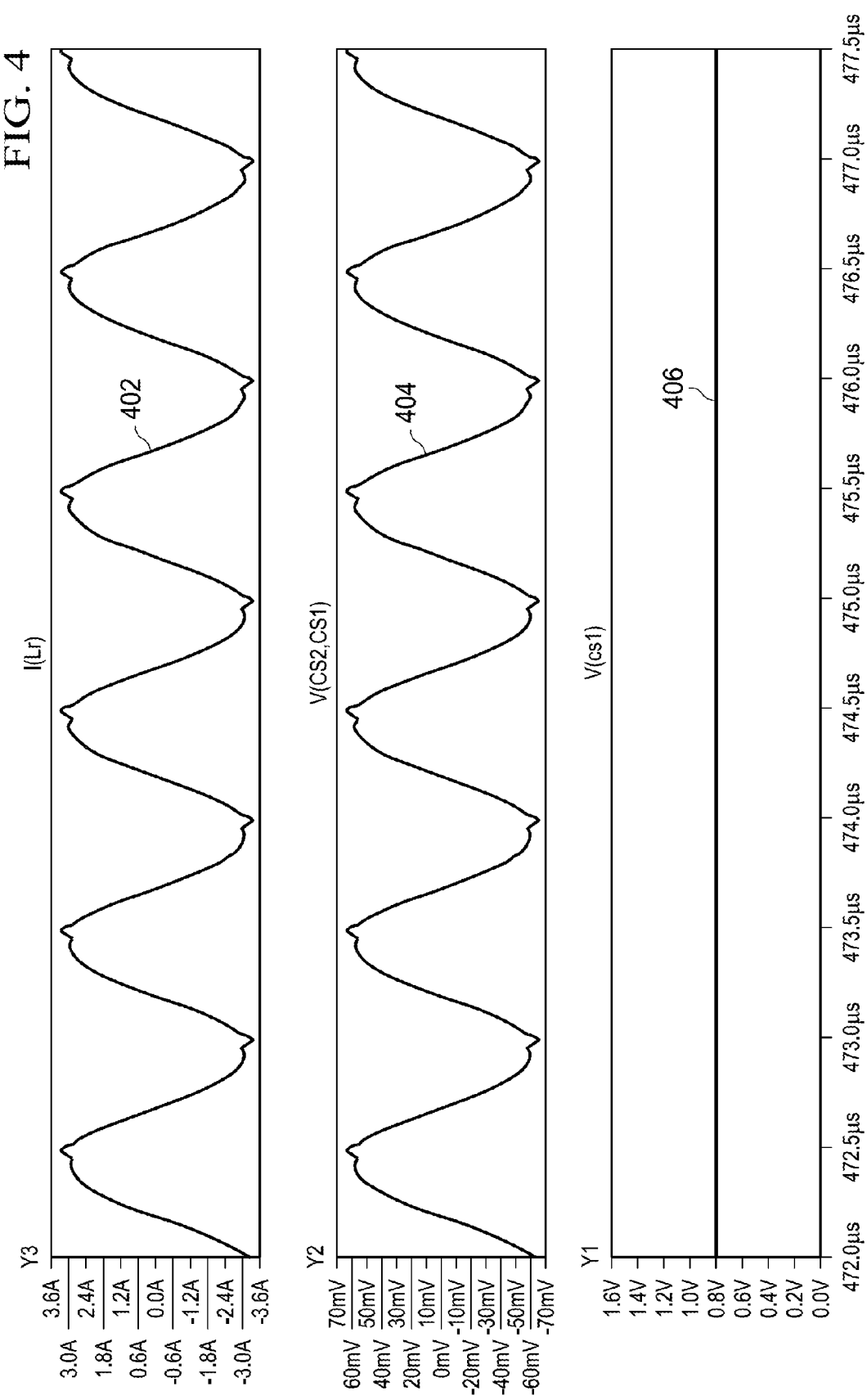
FIG. 4 illustrates light-load switching waveforms of the LLC resonant converter shown in FIG. 3 in accordance with various embodiments of the present disclosure.

FIG. 4 illustrates light-load switching waveforms of the LLC resonant converter shown in FIG. 3 in accordance with various embodiments of the present disclosure. The horizontal axis of FIG. 4 represents intervals of time. The unit of the horizontal axis is micro second. There may be three vertical axes. The first vertical axis Y1 represents the voltage at the output of the average current sensing circuit. The second vertical axis Y2 represents the voltage at the output of the ac current sensing circuit. The third vertical axis Y3 represents the current flowing from the first series resonant inductor Lr.

In some embodiments, the waveforms 402, 404 and 406 are obtained when the LLC resonant converter 200 operates under a light load condition. The definition of a light load condition is based upon different applications and design needs. For example, in some embodiments, a load level less than or equal to 10% of the full load is defined as the light load condition.

The waveform 402 illustrates the current flowing through the first series resonant inductor Lr. As shown in FIG. 4, the current is of a peak value approximately equal to 3 A. The waveform 404 illustrates the voltage CS2 at the output of the ac current sensing circuit. Since the LLC resonant converter 200 operates under a light load condition, the voltage CS2 is relatively small. The peak value of CS2 is about 60 mV. The waveform 406 illustrates the voltage CS1 at the output of the average current sensing circuit. According to equation (1) above, the voltage at the output of the divider is about 0.8 V. The output of the divider, as an offset, is added into the voltage CS1. As a result, CS1 is slightly greater than 0.8 V as shown in FIG. 4.

Figure 5:
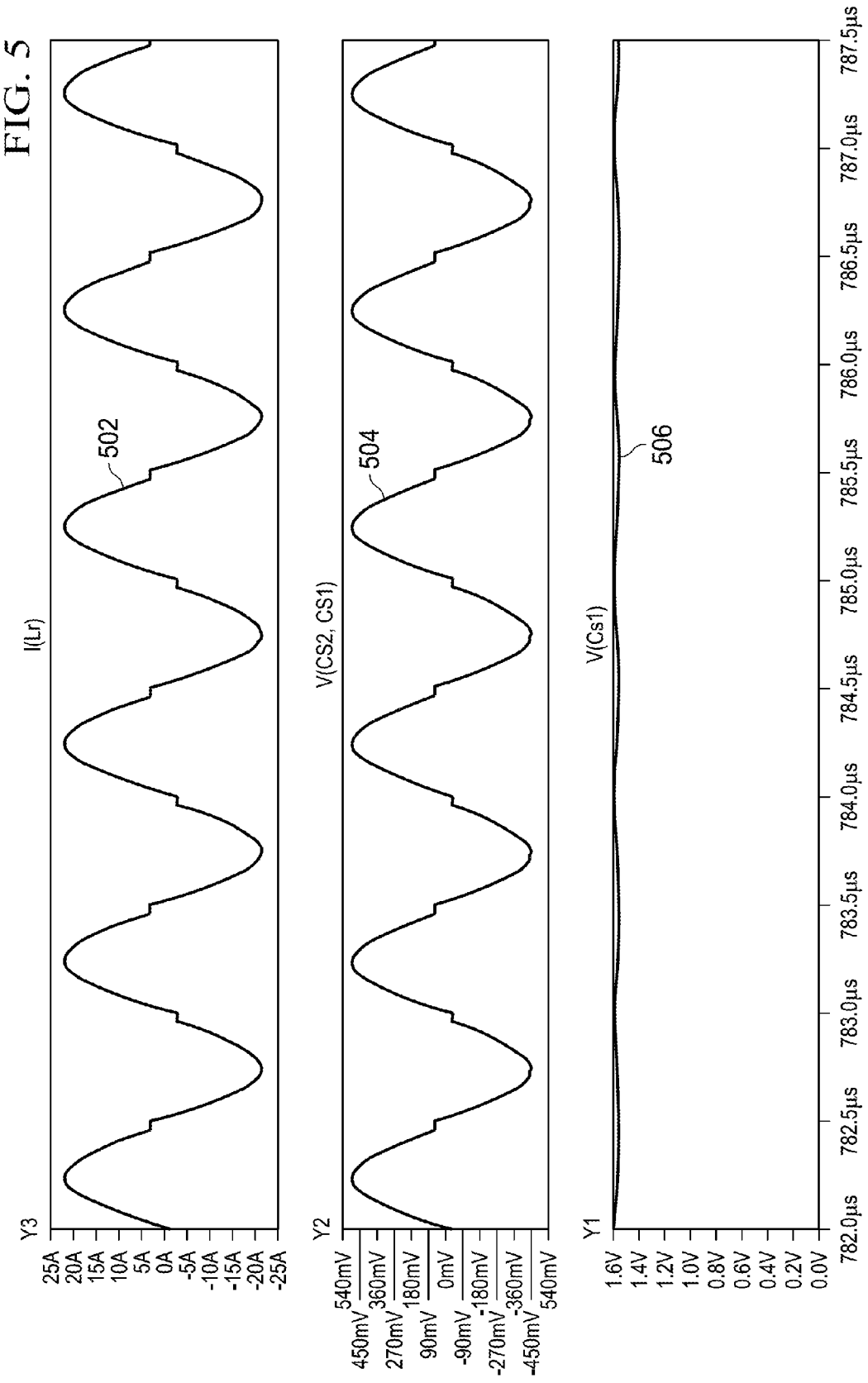
FIG. 5 illustrates heavy-load switching waveforms of the LLC resonant converter shown in FIG. 3 in accordance with various embodiments of the present disclosure.

FIG. 5 illustrates heavy-load switching waveforms of the LLC resonant converter shown in FIG. 3 in accordance with various embodiments of the present disclosure. The horizontal axis of FIG. 5 represents intervals of time. The unit of the horizontal axis is micro second. There may be three vertical axes. The first vertical axis Y1 represents the voltage at the output of the average current sensing circuit. The second vertical axis Y2 represents the voltage at the output of the ac current sensing circuit. The third vertical axis Y3 represents the current flowing from the first series resonant inductor Lr.

In some embodiments, the waveforms 502, 504 and 506 are obtained when the LLC resonant converter 200 operates under a heavy load condition. The definition of a heavy load condition is based upon different applications and design needs. For example, in some embodiments, a load level greater than or equal to 90% of the full load is defined as the heavy load condition.

The waveform 502 illustrates the current flowing through the first series resonant inductor Lr. As shown in FIG. 5, the current is of a peak value approximately equal to 24 A. The waveform 504 illustrates the voltage CS2 at the output of the ac current sensing circuit. Since the LLC resonant converter 200 operates under a heavy load condition, the voltage CS2 is relatively large in comparison with that shown in FIG. 4.

The peak value of CS2 is about 450 mV. The waveform 506 illustrates the voltage CS1 at the output of the average current sensing circuit.

Figure 6:
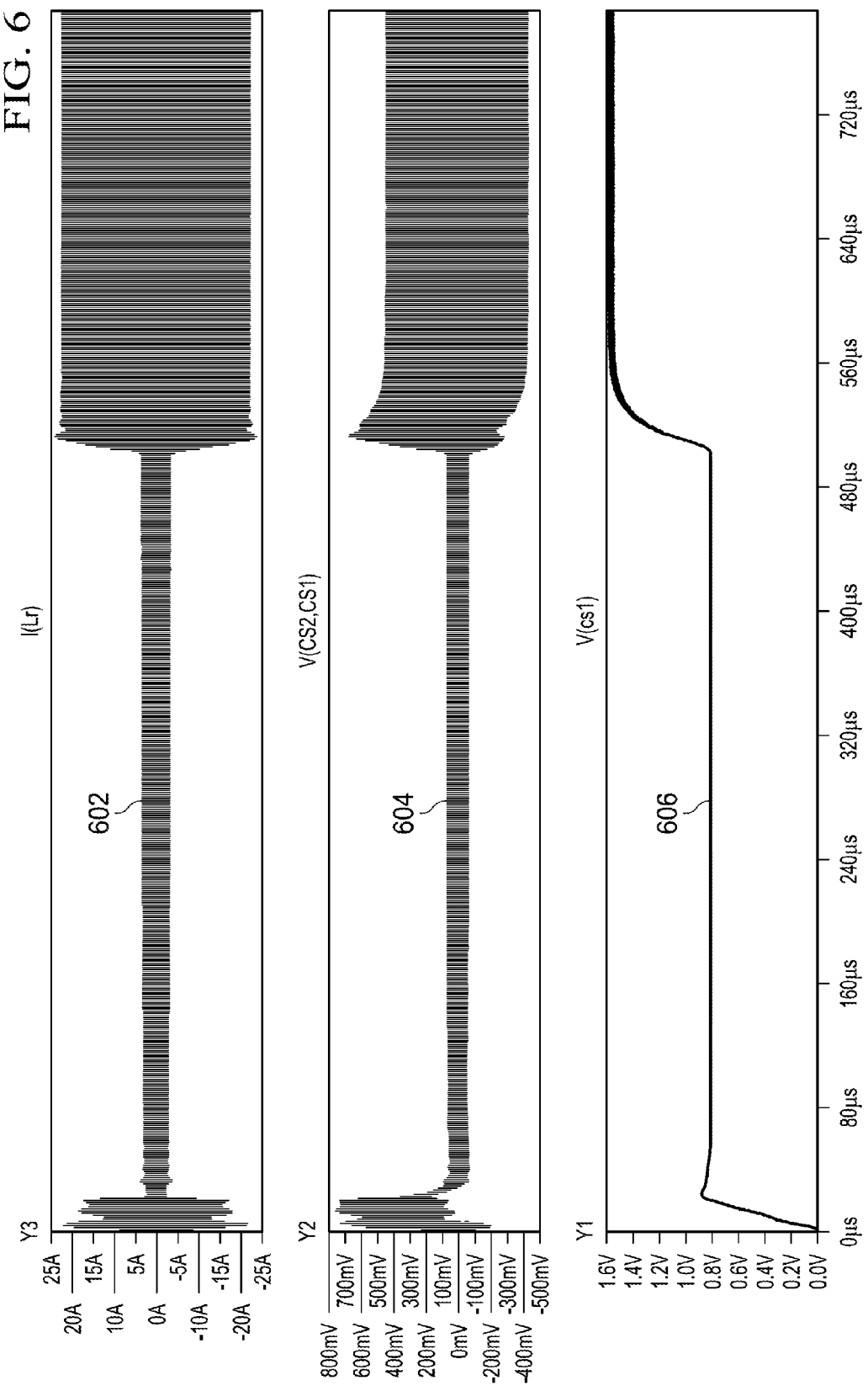
FIG. 6 illustrates transient waveforms of the LLC resonant converter shown in FIG. 3 in accordance with various embodiments of the present disclosure.

FIG. 6 illustrates transient waveforms of the LLC resonant converter shown in FIG. 3 in accordance with various embodiments of the present disclosure. The horizontal axis of FIG. 6 represents intervals of time. The unit of the horizontal axis is micro second. There may be three vertical axes. The first vertical axis Y1 represents the voltage at the output of the average current sensing circuit. The second vertical axis Y2 represents the voltage at the output of the ac current sensing circuit. The third vertical axis Y3 represents the current flowing from the first series resonant inductor Lr.

In some embodiments, the waveforms 602, 604 and 606 are obtained when the LLC resonant converter 200 operates under a load transient such as from a light load condition to a heavy load condition. The light load condition and the heavy load condition have been discussed about with respect to FIG. 4 and FIG. 5 respectively, and hence are not discussed herein to avoid repetition.

The waveform 602 illustrates the current flowing through the first series resonant inductor Lr. As shown in FIG. 5, the current jumps from about 3 A to about 24 A. The waveform 604 illustrates the voltage CS2 at the output of the ac current sensing circuit. In response to the load transient at the first series resonant inductor Lr, CS2 jumps from about 60 mV to about 450 mV as shown in FIG. 6. The waveform 606 illustrates the voltage CS1 at the output of the average current sensing circuit. As shown in FIG. 6, the waveform 606 reflects the current transient occurred at the first series resonant inductor Lr.

Figure 7:
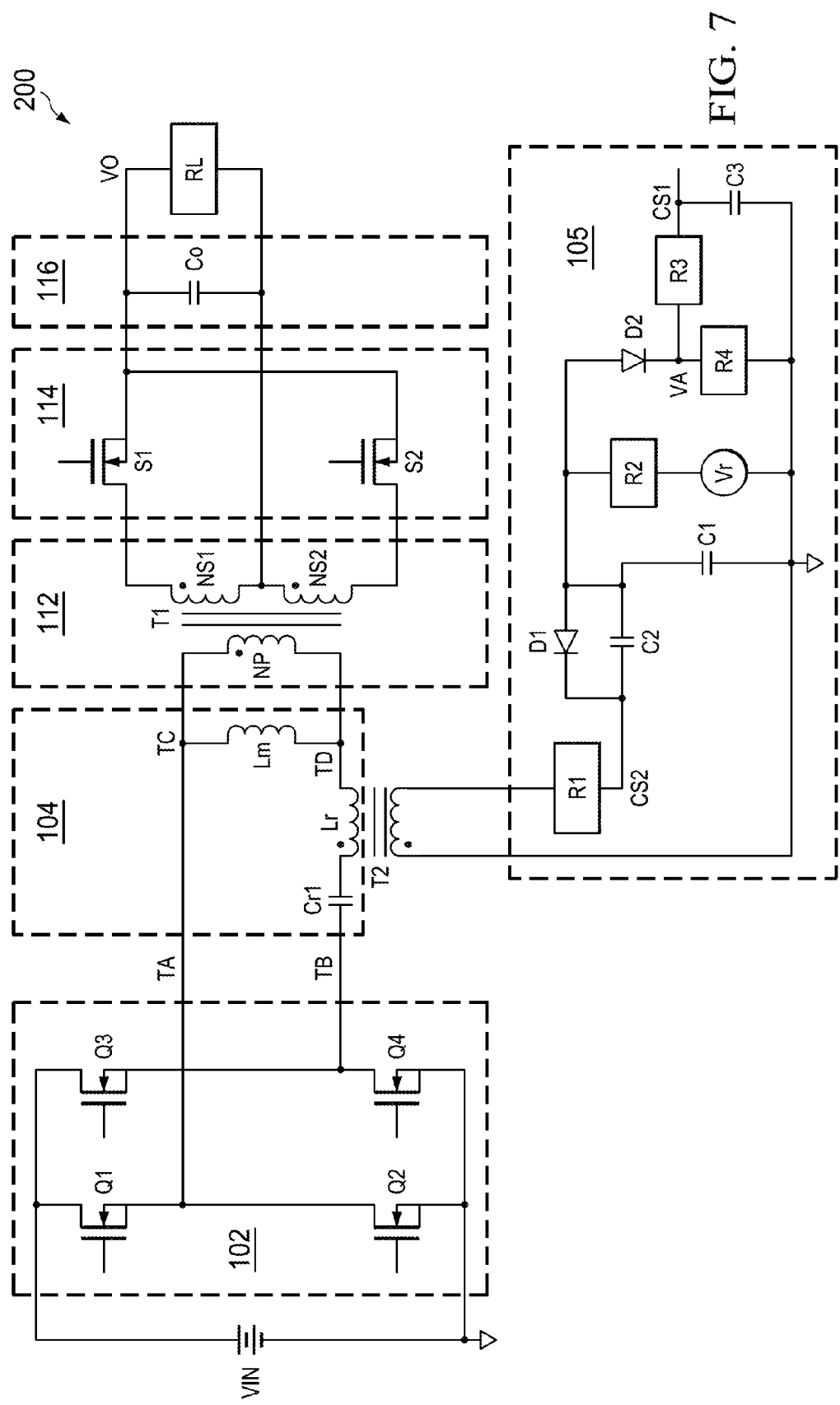
FIG. 7 illustrates a second illustrative implementation of the current sensing apparatus shown in FIG. 2 in accordance with various embodiments of the present disclosure.

FIG. 7 illustrates a second illustrative implementation of the current sensing apparatus shown in FIG. 2 in accordance with various embodiments of the present disclosure. The structure and operation principle of the switching network 102, the resonant tank 104, the transformer 112, the rectifier 114 and the output filter 116 are similar to those shown in FIG. 2, and hence are not discussed again to avoid repetition.

The current sensing apparatus 105 can be divided into three portions, namely an ac current sensing circuit, an average current circuit and a reference voltage circuit. As shown in FIG. 7, the ac current sensing circuit may comprise a resistor R1, a capacitor C1 and a capacitor C2. The output of the ac current sensing circuit is defined as CS2 as shown in FIG. 7. In some embodiments, CS2 is an ac signal, which is proportional to the current flowing through the first series resonant inductor Lr.

The average current sensing circuit may comprise a diode D2 and a RC filter formed by R3 and C3. The output of the average current sensing circuit is defined as CS1 as shown in FIG. 7. In some embodiments, the diode D1 may function as a rectifier. The rectifier is employed to convert the ac voltage generated by the ac current sensing circuit into a dc voltage. In addition, the RC filter is used to attenuate noise so that the current sensing apparatus 105 may generate a noise free dc signal.

The reference voltage circuit includes a reference voltage source Vr and a divider circuit formed by R1, R2 and R4 as shown in FIG. 7. The reference voltage source Vr is employed to provide an offset so that the voltage level of CS1 is in a range suitable for integrated circuits processing the average current signal. The divider circuit is used to adjust the offset so that an appropriate dc voltage signal is fed into the integrated circuits. The voltage VA at the output of the divider is given by the following equation:

$$VA = (Vr - Vd)\frac{(R4 \| R1)}{R2 + (R4 \| R1)} \quad (2)$$

where Vd is the voltage drop across the diode D2. In some embodiments, Vd is approximately equal to 0.7 V.

The voltage VA helps to increase the output voltage of the average current sensing circuit. In other words, the voltage level of CS1 is greater than VA. Depending on different applications and design needs, the reference voltage source Vr can be selected accordingly. As a result, the average current sensing circuit may generate an appropriate dc voltage signal suitable for a downstream circuit coupled to the current sensing apparatus 105.

In some embodiments, the capacitance of C1 is equal to 1 nF. The resistance of R1 is equal to 330 ohm. The capacitance of C2 is equal to 100 nF. The capacitance of C3 is equal to 3.3 nF. The resistance of R2 is equal to 5.1 Kohm. The resistance of R3 is equal to 3.3 Kohm. The resistance of R4 is equal to 1 Kohm. The reference voltage source Vr is about 3.3 V. It should be noted that diodes D1 and D2 may form a temperature compensation circuit.

It should further be noted that the values given above are selected purely for demonstration purposes and are not intended to limit the various embodiments of the present invention to any particular values. A person skilled in the art will recognize that, depending on different application and design needs, the resistance and capacitance recited above may be changed to different values.

Figure 8:
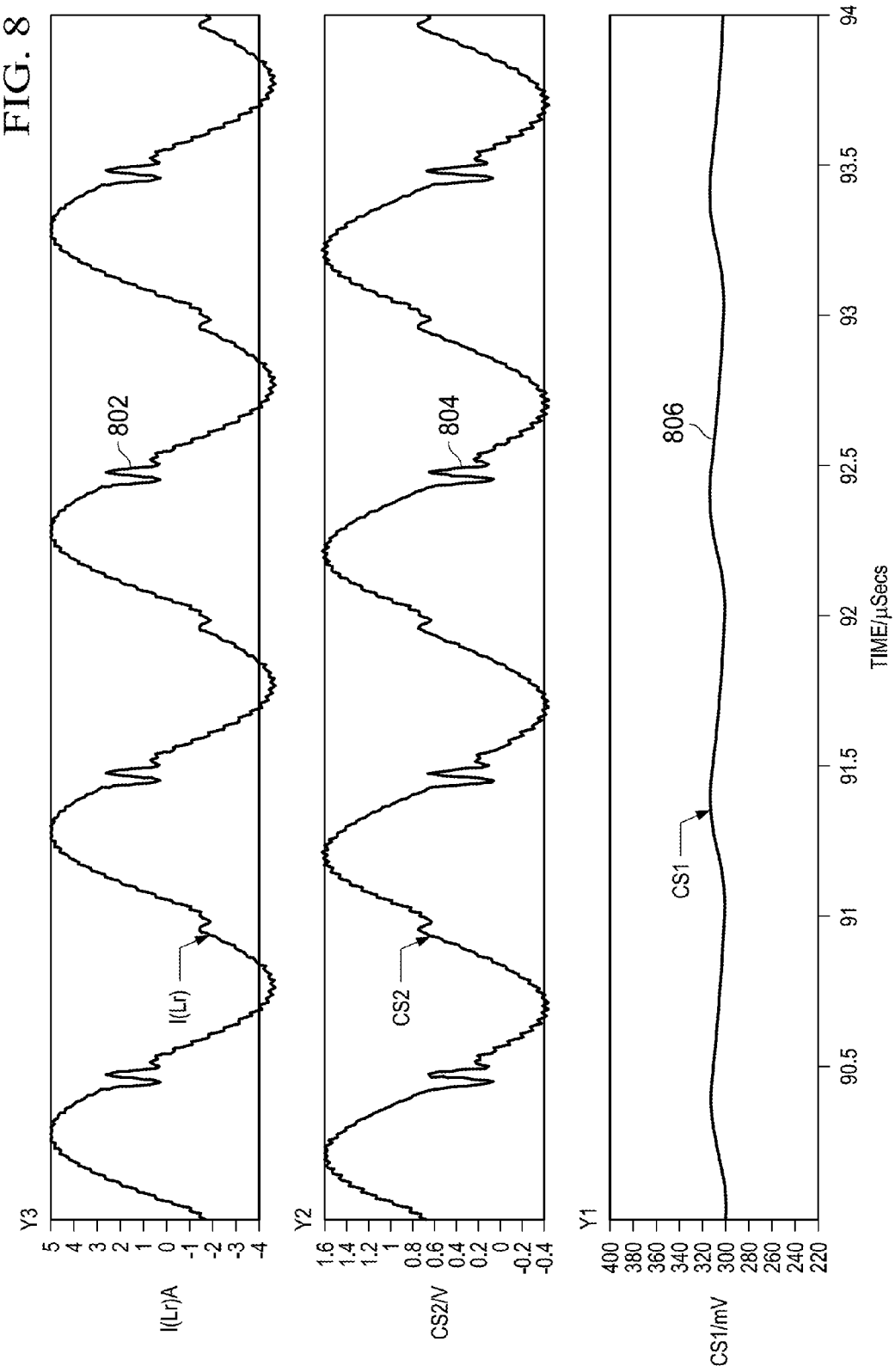
FIG. 8 illustrates light-load switching waveforms of the LLC resonant converter shown in FIG. 7 in accordance with various embodiments of the present disclosure.

FIG. 8 illustrates light-load switching waveforms of the LLC resonant converter shown in FIG. 7 in accordance with various embodiments of the present disclosure. The waveforms 802, 804 and 806 are similar to those shown in FIG. 4, and hence are not discussed herein.

Figure 9:
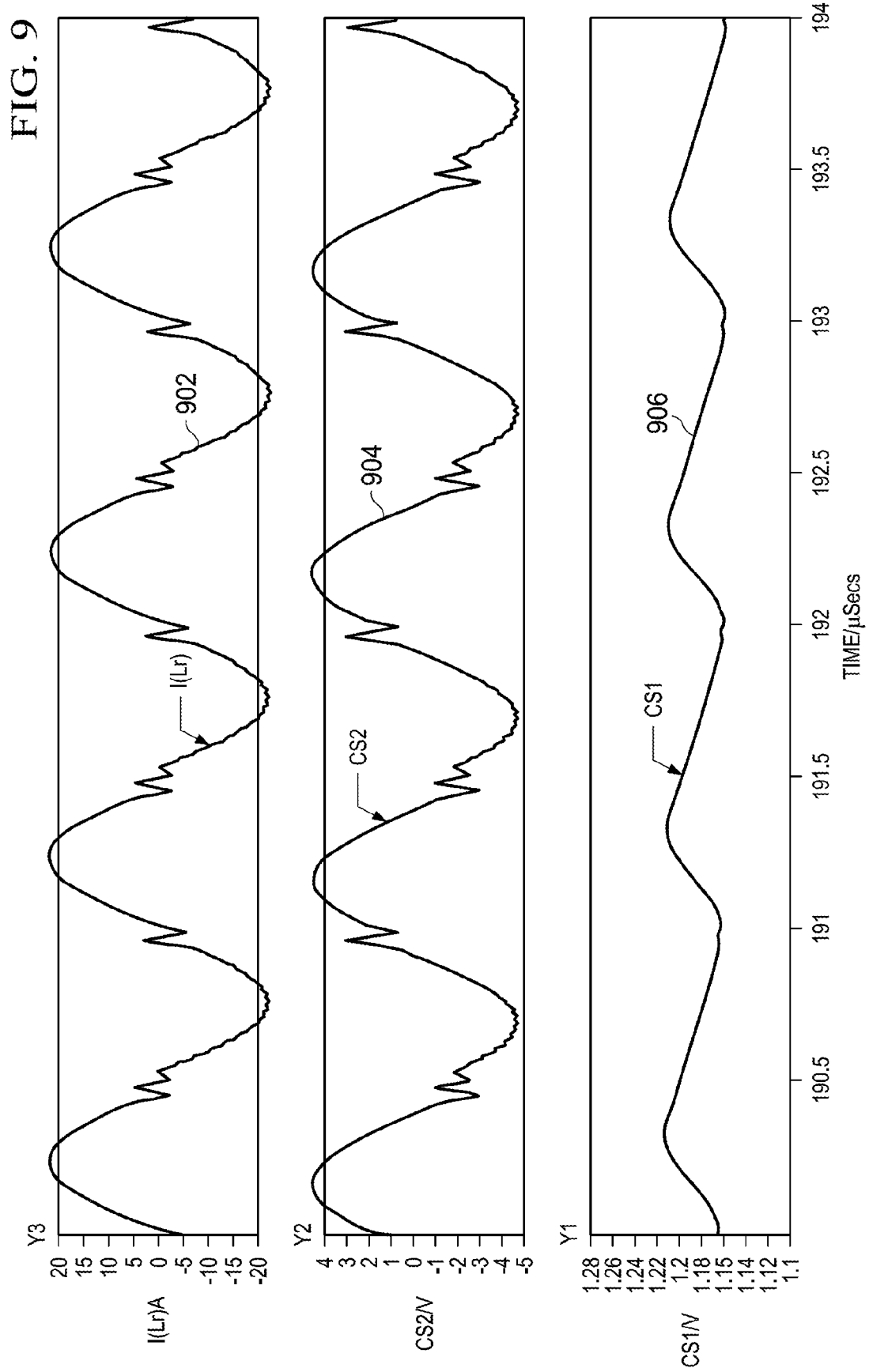
FIG. 9 illustrates heavy-load switching waveforms of the LLC resonant converter shown in FIG. 7 in accordance with various embodiments of the present disclosure.

FIG. 9 illustrates heavy-load switching waveforms of the LLC resonant converter shown in FIG. 7 in accordance with various embodiments of the present disclosure. The waveforms 902, 904 and 906 are similar to those shown in FIG. 5, and hence are not discussed herein.

Figure 10:
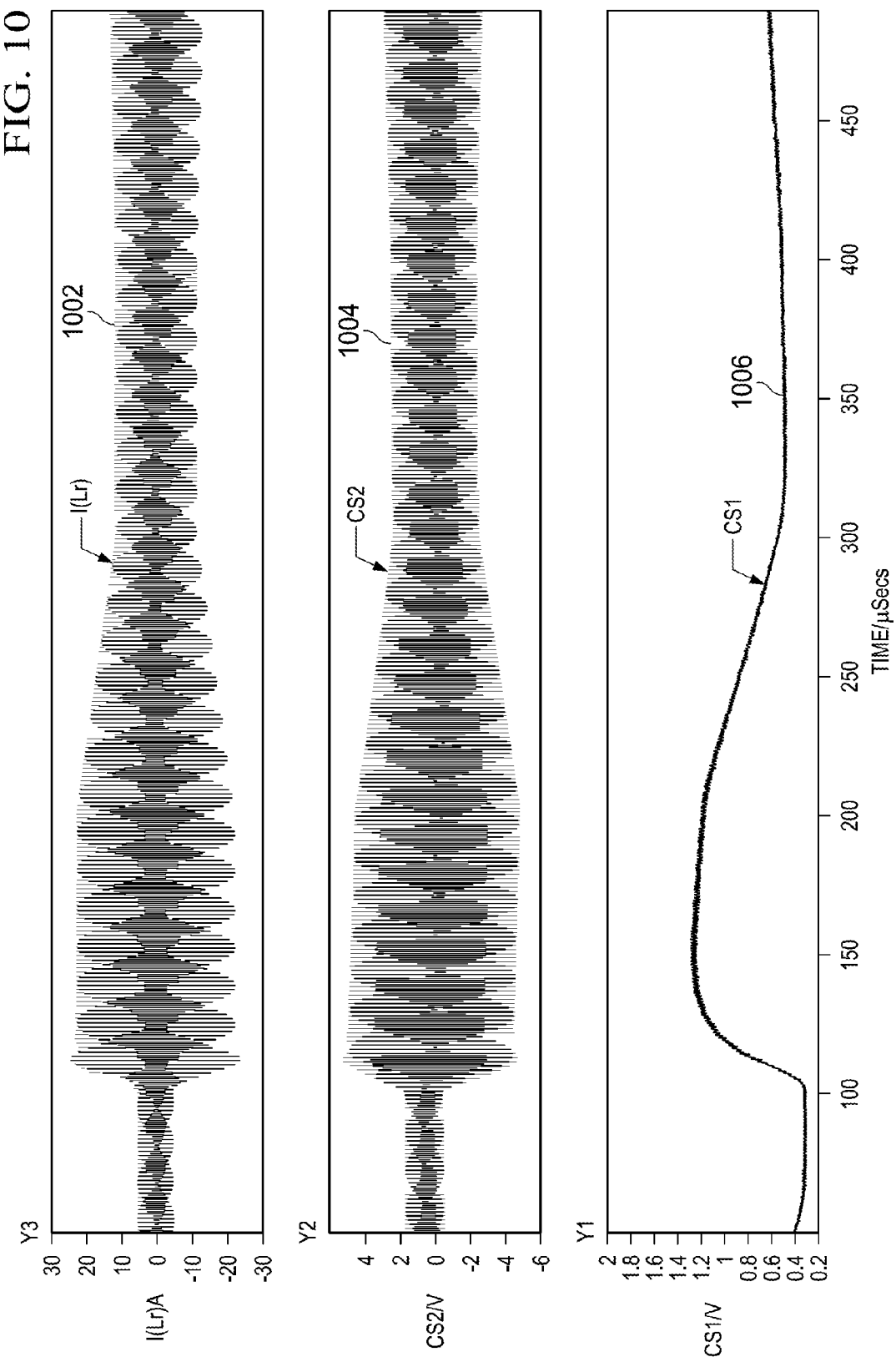
FIG. 10 illustrates transient waveforms of the LLC resonant converter shown in FIG. 7 in accordance with various embodiments of the present disclosure.

FIG. 10 illustrates transient waveforms of the LLC resonant converter shown in FIG. 7 in accordance with various embodiments of the present disclosure. The waveforms 1002, 1004 and 1006 are similar to those shown in FIG. 6, and hence are not discussed herein.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
a switch network coupled to a power source, wherein the switch network comprises a plurality of power switches;
a resonant tank coupled to the plurality of power switches, wherein the resonant tank comprises a series resonant inductor and a series resonant capacitor;
a transformer coupled to the resonant tank;
an output stage coupled to the transformer; and
a current sensing apparatus coupled to the series resonant inductor through a magnetic coupling, wherein the current sensing apparatus is configured to:
generate a detected signal proportional to a current flowing through the series resonant inductor; and
output an average signal of the detected signal.

2. The converter of claim 1, wherein:
the magnetic coupling is implemented as a signal transformer, and wherein:
a primary side of the signal transformer is the series resonant inductor; and
a secondary side of the signal transformer is coupled to the current sensing apparatus.

3. The converter of claim 2, wherein:
the current sensing apparatus comprises a reference voltage source, and wherein the reference voltage source is configured so that a magnitude of the average signal is greater than a voltage level of the reference voltage source.

4. The converter of claim 3, wherein:
the voltage level of the reference voltage source is about 0.8 V.

5. The converter of claim 3, wherein:
the transformer is a center-tapped transformer.

6. The converter of claim 3, wherein the current sensing apparatus comprises:
a first resistor having a first terminal coupled to a first side of the secondary side of the signal transformer and a second terminal coupled to a second output of the current sensing apparatus through a second resistor;
a first capacitor coupled between the second terminal of the first resistor and a second side of the secondary side of the signal transformer; and
a second capacitor coupled to the second side of the secondary side of the signal transformer.

7. The converter of claim 3, wherein the current sensing apparatus comprises:
a first resistor having a first terminal coupled to a second side of the secondary side of the signal transformer;
a first capacitor coupled between a second terminal of the first resistor and a first terminal of a second capacitor; and
the second capacitor having a second terminal coupled to a first side of the secondary side of the signal transformer.

8. The converter of claim 1, wherein:
the converter is an LLC resonant converter.

9. An apparatus comprising:
a magnetic device coupled to an inductor-inductor-capacitor (LLC) resonant converter;
an ac current sensing circuit coupled to the magnetic device;
an average current sensing circuit coupled to the ac current sensing circuit, wherein a detected signal at an output of the average current sensing circuit is proportional to a current flowing through a series resonant inductor of the LLC resonant converter; and
a reference voltage source coupled to the average current sensing circuit, wherein the reference voltage source is configured such that a magnitude of an average signal from the average current sensing circuit is greater than a voltage level of the reference voltage source, and wherein the reference voltage source is configured to provide an offset on the average signal.

10. The apparatus of claim 9, wherein:
the magnetic device is a signal transformer, wherein a primary side of the signal transformer is a series resonant inductor of the LLC resonant converter.

11. The apparatus of claim 9, wherein:
the magnetic device is a signal transformer, wherein a primary side of the signal transformer is a winding of a transformer of the LLC resonant converter.

12. The apparatus of claim 9, wherein:
the ac current sensing circuit comprises:
a first resistor having a first terminal coupled to a second side of a secondary side of a signal transformer;
a first capacitor coupled between a second terminal of the first resistor and a first terminal of a second capacitor; and
the second capacitor having a second terminal coupled to a first side of the secondary side of the signal transformer; and
the average current sensing circuit comprises:
a rectifier formed by a first diode; and
a resistor-capacitor (RC) filter.

13. The apparatus of claim 12, further comprising:
a temperature compensation circuit formed by the first diode and a second diode, wherein the second diode and the first capacitor are connected in parallel.

14. The apparatus of claim 9, wherein:
the ac current sensing circuit comprises:
a first resistor having a first terminal coupled to a first side of a secondary side of a signal transformer and a second terminal coupled to a resistor-capacitor (RC) filter;
a first capacitor coupled between the second terminal of the first resistor and a second side of the secondary side of the signal transformer; and
a second capacitor coupled to the second side of the secondary side of the signal transformer; and
the average current sensing circuit comprises:
a rectifier formed by a first diode; and
the resistor-capacitor (RC) filter.

15. The apparatus of claim 9, wherein:
an output voltage level of the reference voltage source is in a range from about 0.8 V to about 3.3 V.

16. A method comprising:
providing a resonant converter, wherein the resonant converter comprises:
a switch network coupled to a power source, wherein the switch network comprises a plurality of power switches;
a resonant tank coupled to the plurality of power switches, wherein the resonant tank comprises a series resonant inductor and a series resonant capacitor;
an isolation device coupled to the resonant tank;
an output stage coupled to the isolation device through a rectifier; and
a current sensing apparatus;
detecting an ac signal proportional to a current flowing through the series resonant inductor;

providing a reference voltage source coupled to the current sensing apparatus; and converting the ac signal into an average current signal, wherein a magnitude of the average current signal is greater than a voltage level of the reference voltage source.

17. The method of claim 16, further comprising:

providing a temperature compensation circuit coupled to the current sensing apparatus, wherein the temperature compensation circuit is formed by at least one diode.

18. The method of claim 16, further comprising:

coupling the current sensing apparatus to the series resonant inductor through a signal transformer, wherein a primary side of the signal transformer is the series resonant inductor.

19. The method of claim 16, wherein:

the isolation device is a power transformer.

20. The method of claim 19, further comprising:

coupling the current sensing apparatus to the power transformer through a signal transformer, wherein a primary side of the signal transformer is a winding of the power transformer.

\* \* \* \* \*